United States Patent
Meng et al.

(10) Patent No.: US 10,015,238 B2
(45) Date of Patent: Jul. 3, 2018

(54) COMMAND PROCESSING IN DISTRIBUTED COMPUTING SYSTEMS

(71) Applicant: International Business Machines Corporation, Armonk, NY (US)

(72) Inventors: Shicong Meng, Elmsford, NY (US); Jian Tan, Wappingers Falls, NY (US); Ting Wang, White Plains, NY (US); Li Zhang, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 239 days.

(21) Appl. No.: 14/673,900

(22) Filed: Mar. 31, 2015

(65) Prior Publication Data
US 2016/0294921 A1 Oct. 6, 2016

(51) Int. Cl.
G06F 15/16 (2006.01)
H04L 29/08 (2006.01)
A63F 13/352 (2014.01)
H04L 29/14 (2006.01)
A63F 13/358 (2014.01)

(52) U.S. Cl.
CPC ............ H04L 67/10 (2013.01); A63F 13/352 (2014.09); A63F 13/358 (2014.09); H04L 67/1095 (2013.01); H04L 67/32 (2013.01); H04L 69/40 (2013.01)

(58) Field of Classification Search
CPC ..... H04L 67/10; H04L 67/1095; H04L 67/32; H04L 69/40; A63F 13/352; A63F 13/358
See application file for complete search history.

(56) References Cited

U.S. PATENT DOCUMENTS

| 6,628,287 | B1 | 9/2003 | Duda et al. | |
|---|---|---|---|---|
| 7,359,824 | B2 | 4/2008 | Blouin et al. | |
| 9,251,194 | B2* | 2/2016 | Neerincx | G06F 17/30348 |
| 2004/0103138 | A1* | 5/2004 | Lamport | H04L 69/329 709/201 |
| 2005/0165500 | A1 | 7/2005 | Rankin et al. | |
| 2010/0083234 | A1* | 4/2010 | Rabin | G06F 11/3636 717/127 |
| 2010/0113116 | A1 | 5/2010 | Theis | |
| 2011/0119729 | A1* | 5/2011 | Bergeson | G06F 9/5061 726/1 |
| 2013/0035164 | A1* | 2/2013 | Osvald | A63F 13/12 463/42 |
| 2014/0040389 | A1* | 2/2014 | Beardsmore | H04L 51/00 709/206 |
| 2015/0350318 | A1* | 12/2015 | Van Assche | H04L 67/1095 709/202 |

OTHER PUBLICATIONS

Mell et al., "The NIST Definition of Cloud Computing", National Institute of Standards and Technology, Information Technology Laboratory, Version 15, Oct. 7, 2009.

* cited by examiner

Primary Examiner — Ryan Jakovac
(74) Attorney, Agent, or Firm — Anthony M. Pallone

(57) ABSTRACT

Distributed game commands in massive multiplayer online games. A game engine receives commands and determines the order of their execution based on a global order policy using sequencers. The sequencers dispatch the commands to appropriate game engine instances on shards hosting game states. Engine instances execute the commands according to the global order established by the sequencers.

18 Claims, 6 Drawing Sheets

COMMAND PROCESSING IN DISTRIBUTED COMPUTING SYSTEMS

BACKGROUND

The present invention relates generally to the field of distributed computing systems, and more particularly to command processing in such systems.

There are many computer applications whose execution requires large scale physical and virtual computing resources in a distributed computing environment. Some such applications, including, for example, massive multi-player online games ("MMO games", or simply, "MMOs"), include event-driven simulations. Such simulations may be implemented using simulation cycles. In a given cycle of an MMO game, for example, player commands initiated on a client node (for example, on a game console connected to the distributed computing environment) are executed, an updated game state is determined, and the updated game state is sent back to the players. The simulation may appear as occurring in real-time based on each simulation cycle lasting about 20 ms and producing a refresh rate of about 50-60 HZ.

Scaling existing simulations to millions of users in MMO games presents a long-felt but unmet need to maintain the illusion of real-time player experience, while maintaining a reasonable amount of computing resources in light of bandwidth limitations.

SUMMARY

An embodiment of the invention includes a method for executing commands in a distributed computing environment. The method receives distributed commands from one or more devices in the distributed computing environment, where each of the distributed commands from a given device among the one or more devices comprises at least one update command for a game state on at least one shard in the distributed computing environment other than a shard designated for processing local commands of the given device. The method dispatches the distributed commands to servers hosting shards in the distributed computing environment for deterministic execution according to a distributed command execution order. The dispatching is based on update commands of the plurality of distributed commands. A given server in the plurality of servers receives one or more of the plurality of distributed commands updating a state on the given server.

An embodiment of the invention includes a computer system for executing commands in a distributed computing environment. The system includes a computer device having a processor and a tangible storage device, and a program embodied on the storage device for execution by the processor. The program has a plurality of program instructions, including instructions to receive distributed commands from one or more devices in the distributed computing environment, where each of the distributed commands from a given device among the one or more devices includes at least one update command for a game state on at least one shard in the distributed computing environment other than a shard designated for processing local commands of the given device. The program instructions further include instructions to dispatch distributed commands to servers hosting shards in the distributed computing environment for deterministic execution according to a global command execution order. The dispatching is based on update commands of the plurality of distributed commands. A given server in the plurality of servers receives one or more of the plurality of distributed commands updating a state on the given server.

An embodiment of the invention includes a computer program product for executing commands in a distributed computing environment. The computer program product includes a tangible storage device having program code embodied therewith. The program code is executable by a processor of a computer to perform a method. The method receives distributed commands, by the processor, from one or more devices in the distributed computing environment, where each of the distributed commands from a given device among the one or more devices comprises at least one update command for a game state on at least one shard in the distributed computing environment other than a shard designated for processing local commands of the given device. The method dispatches the distributed commands, by the processor, to servers hosting shards in the distributed computing environment for deterministic execution according to a distributed command execution order. The dispatching is based on update commands of the plurality of distributed commands. A given server in the plurality of servers receives one or more of the plurality of distributed commands updating a state on the given server.

DETAILED DESCRIPTION

Figure 1:
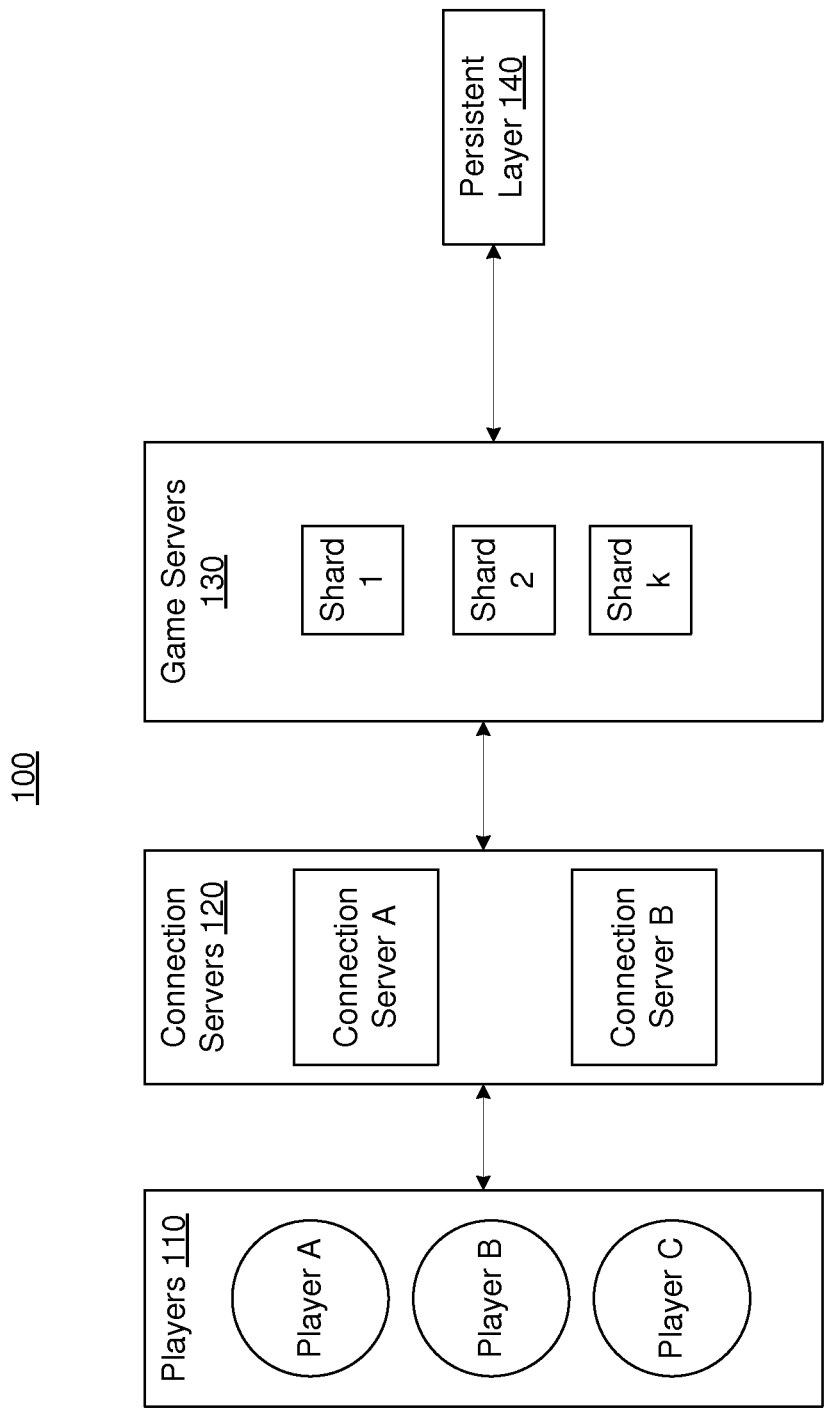
FIG. 1 is a block diagram of depicting a computing environment for executing commands, according to an embodiment of the invention.

An embodiment of the present invention includes a game engine, also called DBox, which may be a distributed, shardless game engine that runs on shared-nothing clusters without using distributed commit protocols while still maintaining consistent global game states. DBox may achieve this, in one embodiment, through a deterministic parallel execution framework that ensures a distributed command running on multiple shards observes consistent game states and unanimously succeeds or fails. Instead of letting one shard run a distributed command by coordinating multiple shards to report and modify their local game states with 2PC, DBox may employ a sequencer component that replicates a distributed command to all relevant shards, each of which then independently executes the command and deterministically reaches the result (success or failure). The sequencer may also establish a global command execution order among distributed commands so that each shard can schedule distributed commands accordingly to provide a consistent snapshot of global game states to the same distributed command running on different shards.

This design may have one or more of the following features, according to embodiments of the invention. First, it allows distributed commands to be independently executed without the combination of 2PC and dynamic locking, which essentially produces distributed locks. It is not only deadlock-free, but also significantly reduces the lock footprint, which in turn leads to good performance. Furthermore, DBox may also employ techniques such as dynamic scheduling of distributed commands and asymmetric command optimization that avoid communication-related waiting during lock holding time for many commands, which makes distributed commands as efficient as local ones.

Second, the deterministic execution also makes it simple and efficient to achieve fault-tolerance and high availability through replication. This is because secondary game engines can asynchronously execute the same input player commands to reach the same game states.

Thirdly, logging and checkpointing can be used in the event of recovery from catastrophic failures. DBox allows efficient logical logging of input player commands rather than performing expensive low-level output game state updates, because the same player commands always lead to the same game state updates. In addition, it also enables online checkpointing without global quiesce thanks to the logical snapshots provided by the global command execution order.

In one example, DBox was used to develop a battle simulation game for evaluation. Results show, in this example, that DBox can reduce the command execution time by 84% over a 2PC-based implementation. For workloads with many distributed commands, DBox's performance is better than that of a simple implementation that does not provide global game state consistency due to its lock footprint minimization techniques.

Discussions about embodiments of the present invention may include references to the following example of an MMO, which may also be referred to as "Game A": an example MMO game may include a virtual world depicting a battle scenario, where players may be units or soldiers participating in the battle. The virtual world may include a battle ground partitioned into multiple areas, where each area may be hosted on a shard (each shard being hosted by a game server). Game units/soldiers may have different affiliations (example, affiliation A and affiliation B), types, strengths, and capabilities. Each unit may try to attack nearby units or remote units (i.e., units hosted on another area hosted by another shard), or make a movement. Details of these commands, according to this example, are listed in TABLE I.

TABLE I

LIST OF PLAYER COMMANDS FOR GAME A

| | |
|---|---|
| local/remote attack (attacker, location) | read attacker's hurt point, reduce the health of unit(s) in the target location(s), if any |
| local/remote heal (healer, location) | read healer's healing point, increase the health of unit(s) in the target location(s), if any |
| local/remote move (mover, location) | check if the location is occupied, move the mover to the location if not |

The following definitions apply in the following discussion, according to an embodiment of the invention. A game object may be defined by a grouping of electronic data. The game object may interact with other objects to undergo change, change the other objects, or to change other data including game states. A game object may include, for example, a simulated character. A game object may also include data defining a subset of game states; for example, health and attack power. A game command includes a set of update procedures applicable to game states. Each update process receives one or more game states as input, and updates one or more game states.

FIG. 1 is a block diagram of a distributed game environment 100, according to an embodiment of the invention. One or more game players 110 ("players") may connect via client devices (for example, a game console) to one or more game servers 130 via one or more connection servers 120. The game servers 130 may be in communication with a persistent layer 140, comprising computing resources such as memory devices that maintain one or more states for a virtual game.

Connection servers 120 generally provide connection facilities to handle communication between players 110 and game servers 130. These communications include receiving game commands from players 110 and communicating resulting game states to players 110.

Game servers 130 may be organized as a series of shards, for example, Shards 1-k. A given player 110, for example, Player A, may be assigned to one shard in the game servers 130, for example, Shard 1. Player A may interact with one or more additional players 110 whose data is processed by Shard 1, but Player A may not interact with players 110 whose data is processed by, for example, Shard 2. Alternatively, if Player A is allowed to interact with players 110 on other shards, the Player A and the other players 110, and indeed the distributed game environment 100 as a whole, will experience an increase in the load on computing resources, such as memory, bandwidth, response time, system stability, game stability, etc., leading to undesirable and limited performance.

Due to its eventual scale ceiling, an efficient cross-shard player interaction on the typical shared-nothing, multi-shard architecture represents a long-felt but unmet need. Clocks on different game servers 130 may be synchronized via Network Transfer Protocol (NTP) which achieves under 1 ms clock skew in LAN environments. Servers usually implement a fail-stop model.

With continued reference to FIG. 1, each game server 130 (shard) essentially runs a discrete-event simulation where events are player commands and virtual world changes. The simulation is further divided into multiple loops. Each iteration of the simulation loop may be referred to as a tick. During each tick, a game server 130 applies events occurred during the tick (player commands, world changes, etc.) to update the game state according to game-specific logics, and sends the updated game states back to players 110. A command usually reads some game states and updates multiple states, e.g., an attack command may update the health and experience of related players 110.

One event, i.e., a logical update, may generate multiple updates of the game state, e.g., a player 110 attack event may update the health and experience of related players 110 as well as the virtual world cell occupancy. Game servers 130 ensure all events occurred within a tick are processed before the start of the next tick. An event lasting longer than a single tick is considered as the same event occurred in multiple ticks. To provide real time gaming experience, game servers 130 may execute simulation loops or ticks at the rate of 30 to 60 Hz. At such execution rate, the active game state is typically kept in memory of the game servers 130 to minimize query and update latency. Typically, game servers 130 use multi-threading and lock-based synchronization to process player commands in parallel. Also, as each tick is very short (around 20-50 ms), players 110 may not be sensitive to the actual execution order of player commands within a tick.

Figure 2:
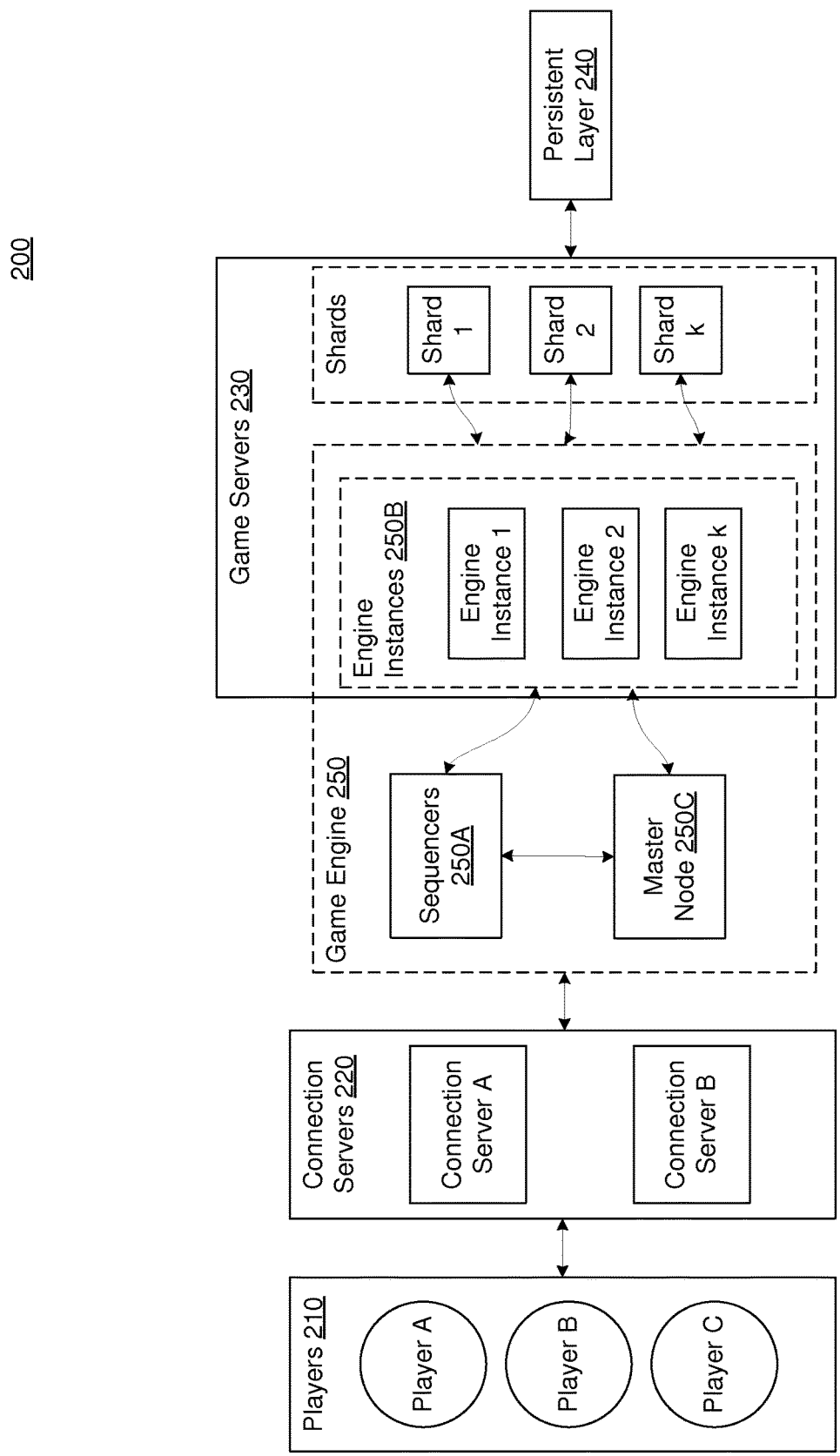
FIG. 2 is a block diagram of a computing environment for executing commands, according to an embodiment of the invention.

FIG. 2 is a block diagram of a distributed game environment 200, according to an aspect of the present invention. Distributed game environment 200 includes some components that may, but need not, be similar to like-referenced components of distributed game environment 100 described above in connection with FIG. 1.

Accordingly, distributed game environment 200 may include players 210, connection servers 220, and persistent layer 240; these components may function similarly, in some respects, to players 110, connection servers 220, and persistent layer 140, respectively, as described in connection with FIG. 1. These components may have additional, fewer, or different functionalities to facilitate unique functions and techniques described herein in connection with embodiments of the present invention, which address limitations and drawbacks of the prior art and introduce additional features.

Distributed game environment 200 may further include a game engine 250 component (also called "DBox") comprising one or more sequencers 250A, engine instances 250B, and a master node 250C. These components may be distributed among one or more game servers 230, and/or additional servers that act as an intermediary between connection servers 220 and game servers 230. The exact configuration of game engine 250 may be varied from one embodiment to the next. Therefore, although some features of game 250 are discussed together with other features, it is not necessary that all features be present in every embodiment of the invention.

In one embodiment, game engine 250 may run at the game server 230 layer, and may provide a set of APIs for game development. Each game server 230 may run one engine instance 250B (where each engine instance 250B is paired with a shard/game server 230).

Generally, master node 250C may monitor the status of each component of game engine 250 and may handle failure events. Sequencers 250A may perform input command sequencing between connection servers 220 and game servers 230. Sequencers 250A may add timestamps to player commands for global command execution ordering, perform logging for recovery, and dispatch player commands to game servers 230 for execution. In one embodiment, a few sequencers 250A may be sufficient where their workload is expected to be light. Engine instances 250B generally may execute commands received from sequencers 250A, with a guarantee that a command observe the most recent game states, i.e., it sees the updates made by its immediately preceding (conflicting) command.

According to an aspect of the invention, in one example, game engine 250 may provide an object-based API that hides the complexity of cross-shard communication from game developers. At the core of the API may be a GameObject abstract which represents a game object that can potentially interact with any other game object. GameObject essentially provides a storage for game states relevant to a game unit. GameObject cannot be directly modified by ad-hoc developer code. Instead, GameObject can be modified through the execution of Command objects. Command is an abstract class with two methods for game developers to implement: read( ) and update( ). The method read( ) loads necessary states of GameObject into a command-local context. The method update( ) implements game logics that generates game state updates based on only the game states loaded into command-local context, and applies the produced game state updates to the relevant local Game Object.

Additional functions and features of game engine 250 and its enumerated components are described, in some instances, with respect to Game A, the example MMO described in connection with TABLE I, above. Game engine 250 may partition Game A's battle ground into multiple shards (each shard being hosted by a game server 230). Game units/ soldiers may have different affiliations (example, affiliation A and affiliation B), types, strengths, and capabilities. Each unit may try to attack nearby units or remote units (i.e., units hosted on another area hosted by another shard), or make a movement.

Game engine 250 may adopt, in one embodiment, a deterministic approach that achieves efficient distributed command execution. This may include configuring game engine's 250 logic such that a distributed player command has the same execution result (success or abort) on all participating shards. This approach bypasses the expensive overhead that 2PC incurs. Arriving at the same execution result on all participating nodes may be achieved, in one embodiment, by making command executions deterministic, where the same input always leads to the same result. Non-deterministic mechanisms may be moved out of the command execution logic. For example, choosing a random attacking target can be performed at the client side. It also means that the result of a command does not depend on whether a participating shard fails. If a shard fails before finishing a distributed command, it may re-execute the command when it recovers (2PC would abort the command). When there are multiple distributed commands, they may be executed based on observing the same version of game states.

In reference to Game A having commands described in TABLE I, consider two units $u_1$ and $u_2$ running on shards $d_1$ and $d_2$ respectively. A heal command $c_1$ raises the health point ("HP") of $u_1$ and $u_2$ from 5 to 20, and an attack command $c_2$ hurts $h_1$ and $h_2$ by 15 HP. If $c_1$ precedes $c_2$, both $u_1$ and $u_2$ should survive $c_2$. However, if $d_1$ executes $c_1$ first and $d_2$ executes $c_2$ first, $u_2$ would be killed. In 2PC, the ordering of distributed commands can be guaranteed theoretically through distributed locking where all participants must acquire locks on all relevant game states before execution. This essentially serializes conflicting commands like $c_1$ and $c_2$. Of course, this would be at a significant cost that can prove prohibitively expensive in the context of MMOs.

To achieve the same effect, game engine 250 may establish a global command execution order for all player commands and make all shards execute commands according to this global order. Based on one possible global order, $c_1$ may always execute before $c_2$ on all shards. If executing a distributed command c on one shard $d_1$ requires to read game states on a remote shard $d_2$, $d_1$ can simply wait for $d_2$ to send in the correct states because $d_2$ also deterministically executes c following the global order. Similarly, when c needs to update a remote state, $d_1$ simply ignores such updates because $d_2$ would perform such updates. This ordered execution avoids holding locks during two round trips of communication. As described in greater detail below, game engine 250 may also employ a number of techniques to maximize execution parallelism, thus eliminating the waiting time associated with remote states for a larger group of commands.

According to an aspect of the invention, the above two traits can enable game engine 250 to operate as a deterministic parallel system which guarantees that the resulting game states of executing a sequence of player commands is the same as those of sequentially executing the sequence of player commands, in order. In essence, this may provide a restricted sequential consistency guarantee. While the original sequential consistency only requires the resulting states to be the same as those of any sequential execution of the input player commands, the restricted sequential consistency limits the resulting states to be the same as those of a given sequential execution of the input player commands.

This deterministic parallelism provides an additional benefit in recovery. Since executing the same input from the same game state always lead to the same resulting state, deterministic parallelism makes recovery as simple as re-executing the same input player commands. More importantly, this means that game engine 250 needs only to access input game commands logs, rather than the actual game updates which may be much larger in size and often requires expensive special hardware in fast logging.

With continued reference to FIG. 2, according to an aspect of the invention, an implementation of game engine 250 may operate as follows. Each sequencer 250A stamps each incoming player command it receives with the current wall clock time, logs it on a persistent storage, and sends it to all relevant engine instances 250B. An engine instance 250B orders commands based on their timestamps and executes them one by one starting from the earliest command. Executing a command may involve sending local states to remote instances and waiting for remote instances to send in their local states. A command is finished only when all messaging sending and waiting is done.

Since there may be multiple sequencers 250A, clock skews and messaging delays may cause commands to arrive at an engine instance 250B out-of-order (with regards to their timestamps). To prevent an engine instance from missing a command that arrives late, game engine 250 may, in one approach, use a bound B that is strictly larger than the sum of clock skews (among all sequencers 250A and engine instances 250B) and the maximum delay of a message. With B, an engine instance 250B executes a command c if an only if $t-t_c>B$, where t is the current wall clock time and $t_c$ is the timestamp of c.

There are a number of characteristics in this implementation that may benefit from further improvement. First, this implementation may depend on B for its correctness. While clock skews can be reduced to <1 ms within a datacenter via NTP, it may be difficult to put an absolute bound on messaging delay, as temporary network slowdown may be common. Even if game engine 250 uses a large B, it would delay the execution of all commands by B, thereby killing any latency sensitive MMO game's performance.

Second, sequential execution may not provide the required high throughput for many MMOs. Engine instances 250B may require employing a certain level of parallelism while maintaining the illusion of sequential execution.

Third, while execution of a distributed command c, i.e., one that reads/modifies remote states, avoids round trips of communication for distributed commit, it still may involve waiting for sending out or receiving game states, which may be much slower than local command execution. Since later commands are blocked before c finishes, the performance of an engine instance 250B may be limited if every distributed command introduces network delay into its execution.

To address these issues, game engine 250 may operate as follows. Similar to the aforementioned implementation, a sequencer 250A adds timestamps and logs incoming game commands. A sequencer 250A confirms receipt of a player command to a connection server 220 only after it logs the command in persistent storage. The connection server 220 acknowledges a player command with its originating game client only after it receives the confirmation from a sequencer 250A. A game client (i.e., player 210) automatically retries to submit a game command if it receives no acknowledgment from a connection server 220 after a timeout. Game engine 250 may ensure that a confirmed player command is eventually executed, even with failures.

Once a command is persisted, a sequencer 250A may immediately dispatch the command to relevant engine instances 250B. In one embodiment, a local command is always sent to a single engine instance 250B. A distributed command is sent to all engine instances 250B associated with the command. A sequencer 250A ensures that for a given engine instance e, distributed commands associated with e are dispatched in the monotonically increasing order of timestamps. This can be ensured at the transport layer.

To illustrate this functionality further, let s refer to a sequencer 250A and S to denote the set of all sequencers 250A. Distributed commands are divided into dispatching ticks which have the same length as ticks but with different start and end times. By default, an i-th dispatching tick begins in the middle of i−1-th tick and ends at the middle of the i-th tick. The sequencer 250A forms a consensus on the end of dispatching ticks before moving to the next one. When such a consensus is formed, it also records it in the player command log. The offset between a tick and its corresponding dispatching tick is to overlap the process of reaching consensus and command processing without introducing additional delay due to consensus.

The consensus at the end of a tick can facilitate ordering and fault tolerance. Without it, an engine instance 250B may have to wait to receive a global command of a later tick before it is certain that it has received all global commands of the current tick. One may suggest that an engine instance 250B could decide whether the next tick has started based on its local clock (assuming all clocks are synchronized), which requires no communication between instances. Nevertheless, this presents an even more serious issue when a sequencer 250A fails in a certain tick. A failed sequencer 250A may not be able to dispatch a global command c to all relevant engine instances 250B. As a result, engine instances 250B that do not receive c may not detect the failure in time and may continue to process commands of the next tick, which would corrupt the game states.

With the consensus result, an engine instance 250B needs only to check whether a consensus is reached (or be notified as in our implementation) before it progresses to the next tick. In addition, since a sequencer 250A may fail at any tick, such a failure would prevent the reaching of the consensus. This allows master node 250C to initiate the replacement process. The consensus results also include a summary of all global commands dispatched during the ended tick. Engine instances 250B can use this information to detect missing global commands (highly unlikely unless with faulty network stack) and retrieve them from corresponding sequencers 250A.

Note that clock skew between engine instances 250B does not break deterministic execution because local timestamps are used merely to establish a global command execution order between player commands. However, serious clock skew could delay the reaching of consensus on the end of a dispatching tick.

In one embodiment, game engine 250 may use Apache Zookeeper ("Zookeeper"; Zookeeper is a trademark of Apache Software Foundation") as a reliable storage for consensus information. Zookeeper provides a storage abstract of a hierarchy of znodes which can be used to store consensus information. Each sequencer 250A may have its own znode. At the end of a tick, a sequencer 250A calls setData( ) on its znode to store the current ending tick number and signatures of global commands it dispatches during the current ending tick. Each engine instance 250B may register a watch trigger which is invoked for modification of a znode for each znode associated with sequencers 250A. It moves to the next tick only if all sequencers indicate the ending of the current tick and it receives all relevant commands reported in znodes. Otherwise, it notifies master node 250C for fault handling after a timeout.

With continued reference to FIG. 2, according to an aspect of the invention, engine instances 250B may function as follows. An engine instance 250B performs simulation loops in ticks. When an engine instance 250B receives a local command, it may immediately execute it as long as it belongs to the current tick. Since local commands do not run on multiple engine instances 250B, their execution order does not need to be synchronized with other instances. The received global commands are stored and ordered. An engine instance 250B starts to execute the global commands of the current tick when the consensus on the end of a dispatching tick is reached.

Concurrency control may be handled as follows. Each engine instance 250B employs a sequential locking algorithm to enforce the global command execution order. Specifically, it uses a single thread to acquire locks (locks here refer to exclusive locks; shared locks are handled similarly) for each command, in order. If a game state is currently locked by another command, engine instance 250B adds the lock-acquiring command to the waiting queue of the game state.

The first command in the waiting queue may always grab the lock when the current lock on the game state is released. Commands that acquire all their locks can be executed in parallel. The locking algorithm never blocks, since a command either acquires all its locks or is added to one or multiple waiting queues. In addition, since conflicting commands always acquire locks in their established order, the locking algorithm is deadlock-free.

Separating local and distributed commands may be handled as follows. One issue with the above execution framework is that distributed commands may be scheduled to run at later stages of a game tick. Many distributed commands involve sending and receiving messages containing game states. When they are scheduled to run at the end of a tick, they may take some time to finish due to the necessary messaging, especially when multiple distributed commands conflict with each other. The consistency of global game states is ensured by the consistent relative ordering of distributed commands on all instances. The relative order between local and distributed commands on each engine instance 250B, however, is not relevant to the consistency of global game states. Therefore, the execution order of commands may be rearranged by scheduling distributed commands to run as early as possible to hide the latency of state transmission between instances. An engine instance 250B leverages the monotonically increasing sequencer-side timestamps to start state transmission as soon as possible. Specifically, for a given global command c with timestamp $(s, t_c)$ on an engine instance e, where s is the ID of the sequencer 250A that dispatches c, and $t_c$ is the timestamp marked by s on c, if $\exists\ (s', t),\ t \geq t_c,\ \forall s' \in S,\ s' \neq s$, then there are no unknown global commands that precede c on e. As a result, e can schedule c to execute. Once e acquires all necessary locks for c, it starts the state transmission process by sending local states read by c to relevant remote instances.

Asymmetric commands may be handled as follows. So far the execution of distributed command involves holding all locks while sending or receiving state-transmission messages. This can be a problem for commands that access hot game states, as the long lock holding time may block all later commands (potentially a large number of local commands) that modify such hot states. For instance, a remote area attack command on a heated battle area hurts all units in the map area, which requires locking all cells of the map area. However, there are lots of local commands such as movements, local attacks and healing occurring on the locked area due to the heated battle and high density of game units. These local commands would have to be blocked until the remote area attack command finishes.

There are a large group of distributed player commands that can be characterized as asymmetric commands. These commands, when running on multiple engine instances 250B, read the state from a subset of all involved engine instances 250B. State-transmission between engine instances 250B can be moved out of the lock holding period of the execution of such commands, which effectively reduces lock holding time from milliseconds to microseconds and greatly reduces the overhead of distributed player commands. To achieve this performance improvement, in one embodiment, game engine 250 may use a dedicated state transmission module and a new command schedule policy, as follows, using a simple example involving two engine instances 250B for the clarity of discussion.

The technique is general and can be used for all asymmetric commands. Consider a command c={R(i), W(i, j)} that reads certain game states on engine instance i and updates certain game states on engine instances i and j. On engine instance i, game engine 250 schedules c to run as soon as possible, as engine instance j needs the result of R(i) to execute c. Once it acquires all locks for c, game engine 250 performs R(i) and sends the result to the dedicated state transmission module (STM). It then continues to perform W(i) (note that W(j) will be handled by instance j) and, when it finishes, releases all locks. The STM makes sure the state transmission message is delivered to engine instance j.

On engine instance j, game engine 250 delays the execution of c until it receives the state transmission message from engine instance i. By delaying the execution of c, game engine 250 avoids holding locks while waiting for remote messages. As a result, local commands that conflict with c and would have to be blocked before c finishes can continue to execute. To avoid blocking commands ordered after c, the lock manager adds c to a special FIFO queue when c is ready to be executed, and continues to process commands ordered after c. If a later command c' conflicts with c, i.e., $RW_c \cap RW_{c'} \neq \emptyset$ where $RW_c$ and $RW_{c'}$ are the read-write set of command c and c' respectively, c' is also added to the FIFO queue after c.

When the state transmission message for c arrives at instance j, game engine 250 schedules c to execute by moving it out of the FIFO queue and acquire locks for it. Specifically, it adds c to the head of lock pending queue so that c can acquire locks as soon as the current command finishes, which minimizes the lock waiting time of global commands ordered after c. Once all locks of c are acquired, game engine 250 executes c with the arrived remote state by performing W(j) and releasing all locks. As a result, the lock holding time of c on both i and j is spent entirely on local execution.

Note that delaying c does not cause negative impact on c's descendant commands. If such a command c' does not conflict with c, its lock acquiring is independent of that of c. If c' conflicts with c, c' cannot acquire all its locks until c finishes. Since c starts to acquire locks when its remote states arrive, the new scheduling policy does not change the execution time of c. Here, c may need to wait for the current lock-holding command to finish when it is inserted to the lock waiting queue. However, a single local command always finishes quickly in MMOs. Therefore, the execution of c' cannot start earlier even if c starts to acquire locks at the beginning of a tick.

Asymmetric commands that read states from more than one instances may be executed in a similar manner where instances that need to read local states for c schedule c to run immediately and instances that only need to receive remote states delay c until all remote states have arrived. TABLE II illustrates the overall locking process in game engine 250, according to an embodiment, where S is the set of local game states, R(c) is the set of game states read by command c, W(c) is the set of game states updated by c, I(s) is the set of game states used as the input for deriving s, s∈W(c), $C_d$, $C_g$, $C_l$ are the set of delayed global commands, newly arrived global commands, newly arrived local commands respectively.

TABLE II

LOCK ACQUIRING ALGORITHM

Procedure lockAcquiringLoop( )
    while $C_d$ ≠ Ø do
        c ← oldest command in $C_d$;
        if c has no pending remote states then
            acquire(c); $C_d$ ← $C_d$ \ c;
        else
            break;
    if $C_g$ ≠ Ø then
        c ← oldest command in $C_g$;
        Rl ← S ∩ R(c), $W_l$ ← S ∩ W(c);
        If ∃s, I(s) ⊄ $R_l$, s ∈ $W_l$ then
            $C_d$ ← $C_d$ ∪ c;
        else
            acquire(c);
            $C_g$ ← $C_g$ \ c; continue;
    If $C_l$ ≠ Ø then
        c ← oldest command in $C_l$; acquire(c);
Procedure acquire(c)
    foreach s ∈ ($R_l$ ∩ $W_l$) do
        if s is not locked then
            c.grant(s);
        else if c ∈ $C_d$ then
            insert c to the head of Q(s);
        else
            insert c to the tail of Q(s);

With continued reference to FIG. 2, game engine 250 may perform fault tolerance functions as follows. Fault tolerance is significant for MMOs, because failure is inevitable for large-scale distributed systems, and service unavailability could tamper the fate of a popular game. Game engine 250 takes advantages of deterministic execution and uses replication to provide fault-tolerance.

In one aspect, game engine 250 may use active and passive clusters. A production environment can deploy an active game engine 250 cluster and one or multiple passive game engine 250 clusters. The active cluster receives player commands directly from connection servers 220 and produces the player command log. Each engine instance 250B also records the ordering between local commands and global commands for each tick on a persistent storage. Specifically, for each global command c, it records the ID of the local command that conflicts with c and acquired locks immediately before c. Such a local command may not exist within the current tick, in which case a NULL ID is used. The recording of ordering is performed asynchronously as each instance executes commands. However, an engine instance 250B waits for the recording to complete (usually fast due to its small footprint) before sending out game state updates and starting the next tick.

Player command logs, along with the execution order log of each engine instance 250B, are asynchronously replicated to passive clusters. Within a passive cluster, sequencers 250A do not connect to connection servers 220, but read the replicated logs and dispatch commands to engine instances 250B just as their replicas in the active cluster. They also divide commands into different ticks according to the log and update znodes accordingly. Similarly, engine instances 250B execute local and global commands received from sequencers 250A in the same way as in the active cluster, except that they deterministically perform locking according to the global command execution order recorded on the active cluster. This ensures that the game states of each passive instance are the same as those of the corresponding active instance. Given the above structure, failures may be handled as follows.

Sequencer 250A failures can be handled within the current active cluster. When an engine instance 250B reports a timeout of a sequencer 250A, master node 250C announces the failure of the reported sequencer 250A (so that all its future messages, if any, are ignored) and starts the process of replacing the faulty sequencer 250A (the underlying LAN may be assumed to be reliable). Thanks to its stateless design, the sequencer 250A simply reads all player commands received in the last incomplete tick which are recorded in the persistent storage and processes all new commands forwarded by connection servers. To complete the halted tick (recall that all engine instances 250B are blocked on the znode associated with the failed sequencer 250A), the new sequencer 250A resends all commands (discovered from the persistent storage and connection servers 220) belonging to the halted tick, and then, updates its consensus znode. Engine instances 250B ignore commands they have previously seen, and process only new ones. Since in-order delivery is guaranteed at the transport layer, an engine instance 250B can start from where it stops when the previous sequencer 250A fails, with a consistent order of global commands. It continues with the next tick after seeing the updated consensus znode of the new sequencer 250A.

Engine instance 250B failures may be handled as follows. As connection servers 220 forward game state updates from engine instances 250B to players 210 every tick, they can detect the failure of an engine instance 250B with a timeout. When an engine instance 250B fails at tick t, master node 250C redirects the input command stream from connection servers 220 to sequencers 250A of a passive cluster. Due to the asynchronous log replication, these sequencers 250A first catch up with all commands in the log before they start to process commands from connection servers 220. Note that a confirmation mechanism between connection servers 220 and sequencers 250A ensures that no commands are lost during the redirection as they are either in the logs or will be forwarded to the fail-over cluster. Engine instances 250A in the fail-over cluster follow the ordering log to execute global commands if such a log is available. Otherwise, they start to process commands as an engine instance 250B in the active cluster. Because the ordering log is persisted before an engine instance 250B sends out player 210 game updates, players 210 would never observe inconsistent game states during the failover process.

Checkpointing and recovery may be performed as follows. Large-scale failures such as network disruption, power outage and disasters may cause all clusters to fail. To recover from such failures, game engine 250 leverages an efficient checkpointing technique to take consistent snapshots of game states across all instances without stopping any instance. Specifically, a snapshot can be specified on a particular tick t to capture the game states at the end of t on all engine instances 250B. When a snapshot is due, an engine instance 250B begins to keep two copies for each game state m, namely m' and m1, with copy-on-write. Any command after t always read and update m'. In essence, m1 keeps the game state at the end of t while the game proceeds. A separate checkpointing thread reads m1 if it exists or m' if otherwise to capture the snapshot. All engine instances 250B can perform checkpointing independently without coordination. Once the checkpointing completes, an engine instance 250B reclaims all m1. The recovery process starts by first loading the most recent snapshot created at the end of tick t at all engine instances 250B, and then allowing all engine instances 250B to execute commands recorded after t in the same way as those in a passive cluster. The cluster is ready for operation once all engine instances 250B finish the recorded commands.

With continued reference to FIG. 2, an implementation of game engine 250 using Java 1.7 (Java is a trademark of Oracle) is described. This implementation uses Remote Procedure Call (RPC) as the underlying communication protocol. In this implementation, Apache Thrift 0.9.1 may be used as the code generator and the RPC stack.

Additionally, this implementation is compared to the following implementations: i) Barebones (BB), which implementation reads and updates remote states through request/response messages without using any remote locks or distributed commit protocols. It provides no consistency guarantee, but offers a performance reference point for shardless systems with minimum overhead; ii) Two-Phase Commit (2PC). This implementation uses 2PC to ensure global game state consistency across shards. Each global command involves at least two round trips of communication and requires locking of game states on all participating shards during the execution; iii) an alternate implementation of game engine 250 called DBOX Vanilla (DBox-V). The vanilla version uses sequential locking mechanism for acquiring locks for all player commands (both local and global) according to the global command order; iv) an alternate implementation of game engine 250 called DBox with Separate Scheduling (DBox-S). This implementation adds to DBox Vanilla by scheduling global commands to run as early as possible; v) an alternate implementation of game engine 250 called DBox with Optimized Asymmetric Command (DBox-A). This implementation builds on DBox-V and DBox-S by including optimization for asymmetric commands.

In this example implementation, game engine 250 includes a default deployment of two sequencers 250A and 10 engine instances 250B. Game engine 250 is evaluated by varying the percentage of global commands in workloads to highlight the performance impact of global commands.

Evaluations show that 2PC has the longest tail as commands have a wide range of execution time under it. This is because 2PC combines two round trips of communication with locking to achieve atomicity, which in turn contributes to high execution latency. Barebones has much better performance compared with 2PC. However, many global commands under Barebones may still need multiple rounds of communication, e.g., request/response for reading remote states and request for updating remote state. DBox-V allows global commands independently send and receive local states, which could overlap the latency of the two directions of communication. However, since it strictly executes command according to the global command execution order, many global commands may need to wait for remote states as the other party may schedule the corresponding global command to run at a later time. DBox-S and DBox-A address this issue by scheduling local and global commands separately, and always prioritize global commands which read local states. In particular, DBox-A eliminates communication delay from lock holding time by optimizing asymmetric commands (which cover most remote commands such as remote attack).

Comparing the average execution latency of different approaches given increasing portions of global commands in the workload leads to the following observation. The execution time in 2PC increases dramatically with more global commands because holding locks during 2PC is very expensive in terms of lock footprint, especially when local commands and global commands conflict (which is often the case with increasing global commands such as remote area attack). Barebones has much better performance as it does not hold remote locks when executes a global command, but it still needs to wait for remote states, which contributes to the increase of execution latency with more global commands. Similarly, DBox-V also suffers from the state-waiting delay as it cannot schedule state-reading global commands early. The much lower latency of DBox-S and DBox-A indicates the importance of independent distributed command execution and overlapping of communication delay.

An analysis of throughput of all five approaches with increasing portions of global commands leads to a repeat of previous results: 2PC has the lowest throughput due to its high lock footprints The performance of DBox-A given increasing numbers of engine instances, where the upper chart shows the changes of average execution time and the lower chart shows the changes of throughput, yields the following results. As workloads are generated on a per-instance basis, each new engine instance 250B brings additional workloads (the same set of sequencers 250A may be used in the default deployment as they can handle the increased workloads). The execution latency remains the same during the scaling thanks to the avoidance of distributed locks. The deterministic execution in DBox allows each engine instance 250B to independently execute global commands without explicit communication for synchronization. Even in the case of reading remote states, DBox-A can still minimize the corresponding waiting time by scheduling global commands as early as possible and avoid holding locks and waiting, under the same deterministic execution guarantee. DBox-A also provides a near-linear scalability in terms of throughput given increasing instances, which clearly indicates the benefit of deterministic execution.

Evaluating changes of average command execution latency in 60 consecutive game ticks (each spans 20 milliseconds) while invoking a checkpoint at the $20^{th}$ tick yields the following results. The checkpoint process lasts about 42 ticks, during which all engine instances 250B save a consistent copy of their local states to local disks based on the techniques described above. All engine instances 250B still execute player commands during the checkpoint process.

The checkpoint causes a small increase of execution latency (about 15% in average and no more than 25%). The increase of latency is primarily due to the CPU usage for state copying and serialization. Still, the entire checkpoint does not increase lock footprint for command execution.

Figure 3:
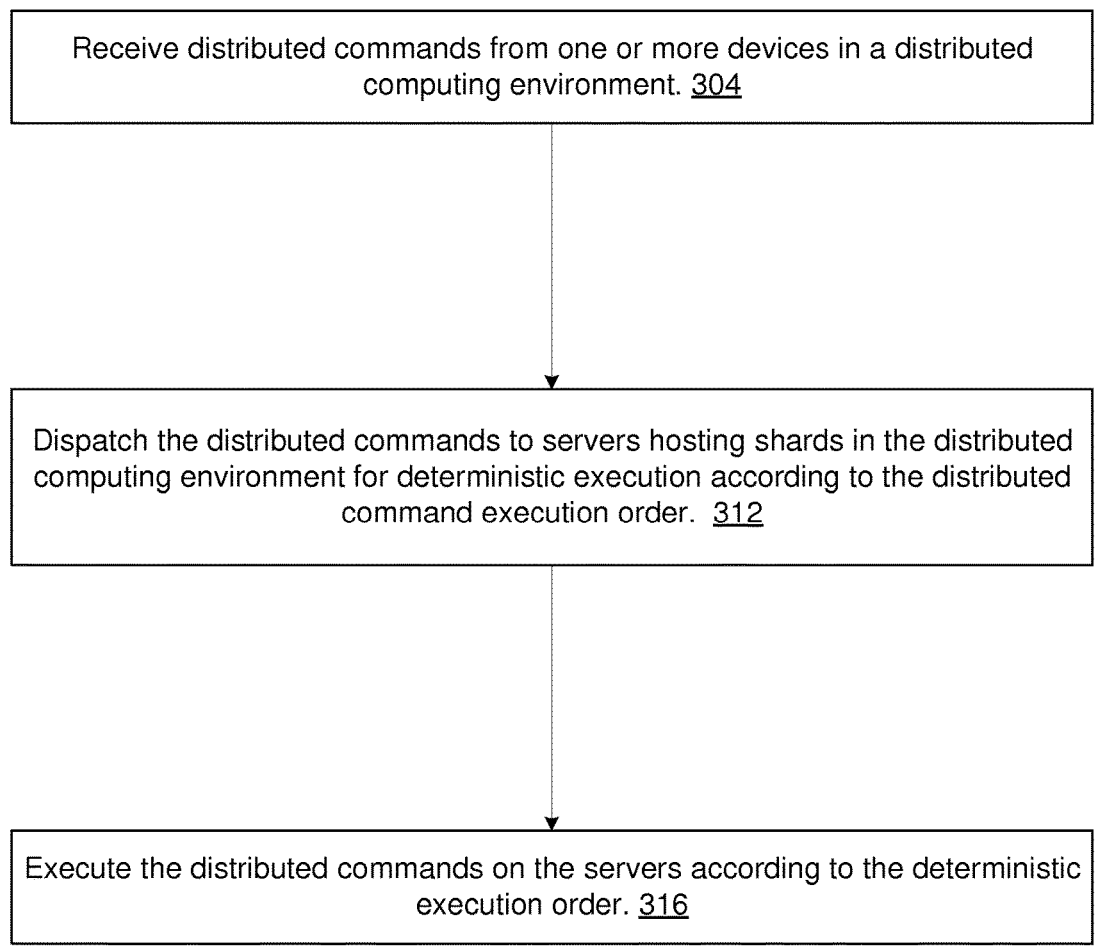
FIG. 3 is a flowchart of a method 300 for executing commands in a distributed computing environment, according to an embodiment of the invention.

FIG. 3 is a flowchart of a method 300 for executing commands in a distributed computing environment, according to an embodiment of the invention. Method 300 may be implemented via program instructions executed using one or more processors of one or more computing devices, each of which may be a device as described in connection with FIGS. 2 and 4. In one embodiment, method 300 may be implemented used one or more components of distributed game environment 200 (FIG. 2), including, for example, components of game engine 250.

Referring now to FIGS. 2 and 3, at step 304, game engine 250 may receive distributed commands from one or more players 210 (players 210 may communicate with game engine 250 using one or more client devices, such as game consoles) through one or more connection servers 220. In a related embodiment, game engine 250 may also receive local commands.

In one embodiment, receipt of game commands, including distributed commands, may be by the sequencer 250A component of game engine 250. At step 304, in one example, two or three (or more) sequencers 250A may perform one or more of the following functions: (i) receive game commands directly or indirectly from players 210; (ii) establish a deterministic global command execution order of distributed commands (for example, the global order may classify commands into several types, and determine that a first type is to be executed before a second type in every case); (iii) add timestamps to commands prior to dispatching them; (iv) log incoming commands including their timestamps, which may be used for fault tolerance procedures; (v) send a confirmation of receipt of a command to a corresponding or connection server 220 upon logging, where the connection server 220 acknowledges the command with the originating player 210 only after receiving the confirmation from sequencer 250A; and other functions.

In an aspect of the invention, players 210 may retry sending commands to game engine 250 if sequencers 250A do not send a confirmation via connection servers 220 after a timeout period.

At step 312, sequencers 250A may dispatch received commands, including distributed commands, to corresponding engine instances 250B. A given command corresponds to a given engine instance 250B if it reads, writes, updates, or otherwise pertains to a game state hosted on a shard handled by the given engine instance 250B. Dispatching may be, in one embodiment, according to a monotonically increasing order of timestamps of distributed commands.

Dispatching may further include dividing distributed commands into dispatching ticks which have the same length as ticks but with different start and end times, as discussed in connection with FIG. 2. As part of the dispatching, sequencers 250A may form a consensus on the end of dispatching ticks before moving to the next dispatching tick. When such a consensus is formed, sequencers 250A may record the consensus in command logs.

At step 316, engine instances 250B execute the commands dispatched to them by sequencers 250A independent of one another. Command execution may involve game simulation loops in ticks. Since local commands do not run on multiple instances, their execution order does not need to be synchronized with other engine instances 250B. The dispatched distributed commands are stored and ordered on relevant engine instances 250B, and engine instances 250B begin to execute them when consensus is reached with sequencers 250A on the ends of dispatching ticks.

More specifically, Engine instances 250B guarantee that a command execution observes the most recent relevant game states, where updates made by immediately preceding commands are available. Engine instances 250B may execute commands in ticks, where they execute commands of a current tick, store and order global commands, and execute global commands upon consensus on the end of a dispatching tick (the consensus is reached with sequencers 250A). Engine instances 250B may determine that a consensus has been reached for a given command by consulting command logs maintained by sequencers 250A. Execution at step 316 may include concurrency control and parallel command execution.

Execution of asymmetric commands, i.e., commands that run on multiple engine instances 250B and read the states of a subset of all involved engine instances 250B, may be performed using a dedicated STM, as described in connection with FIG. 2. Using the STM allows game engine 250 to remove state-transmission between engine instances 250B out of the lock holding period of the execution of asymmetric commands; this may reduce lock holding times from milliseconds to microseconds and greatly reduce the overhead of distributed commands. Additional details of this process are provided in TABLE II.

The global command execution order may provide, in an embodiment, a preference for executing distributed commands before local commands. In one implementation, engine instances 250B may perform logging functions by logging the execution order of commands dispatched to them (including, in one example, local commands).

At step 316, game engine 250 may perform fault tolerance functions, including the following. Master node 250C may detect a failure of a given engine instance 250B. Upon recovery of the failed engine instance 250 (which may be on the same or on a different physical game server 230), the recovered engine instance 250 may attempt to re-execute commands that have been dispatched to it. Re-execution may include accessing the commands logs maintained by sequencers 250A, and re-executing the commands therein according to the distributed global command execution order and based on the timestamps of the commands. In one embodiment, fault tolerance may be performed using active and passive clusters.

Method 300 may execute, at step 316, local commands in addition to distributed commands. Execution of local commands may be done according to a pre-determined order, or according to another execution policy. Game engine 250 may implement a preference for performing distributed commands as early as possible relative to local commands.

Execution of distributed commands at step 316 may include, in one aspect of the invention, obtaining state locks for one or both of local and distributed commands according to a sequential locking mechanism, as described above in connection with FIG. 2.

Figure 4:
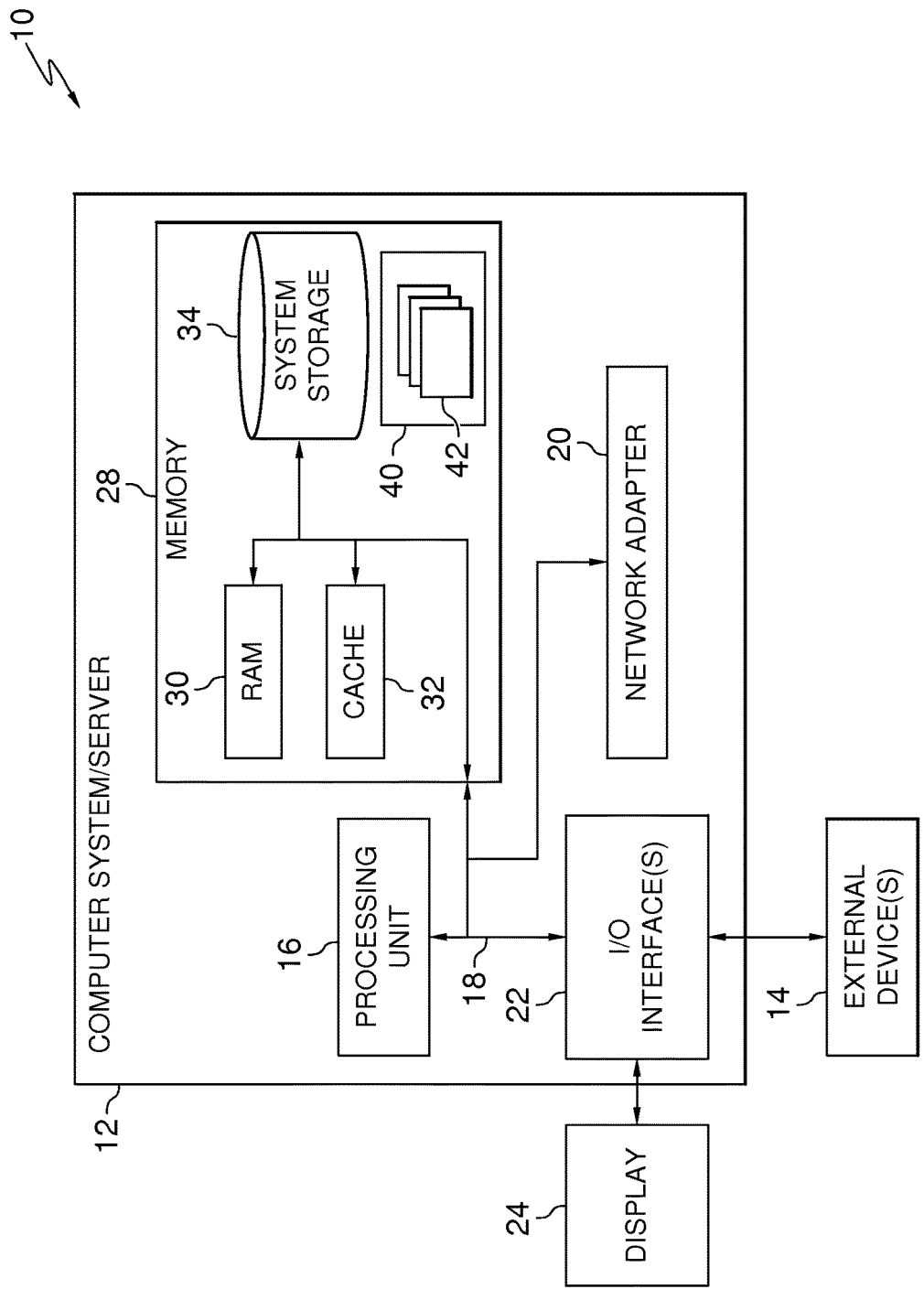
FIG. 4 is a block diagram of a computing device, according to an embodiment of the invention.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
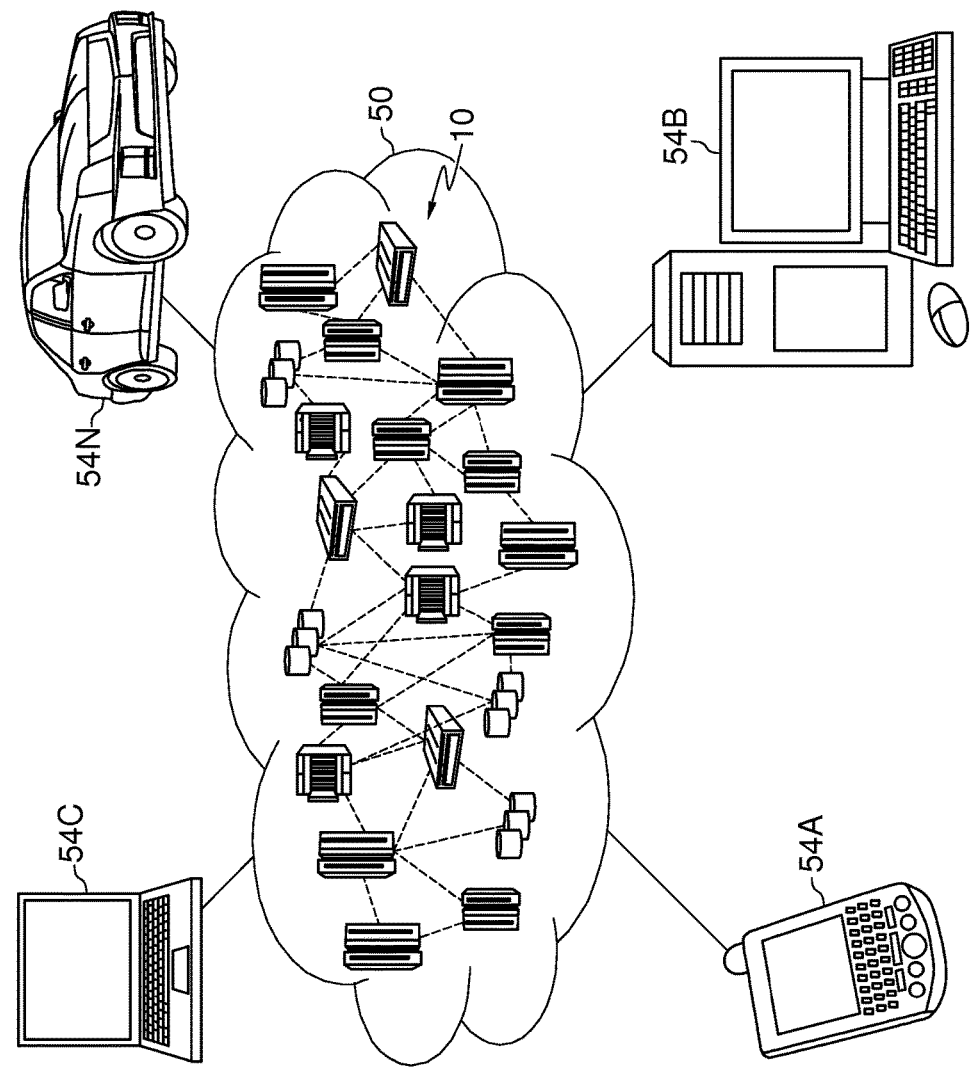
FIG. 5 is a block diagram of an illustrative cloud computing environment, according to an aspect of the invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
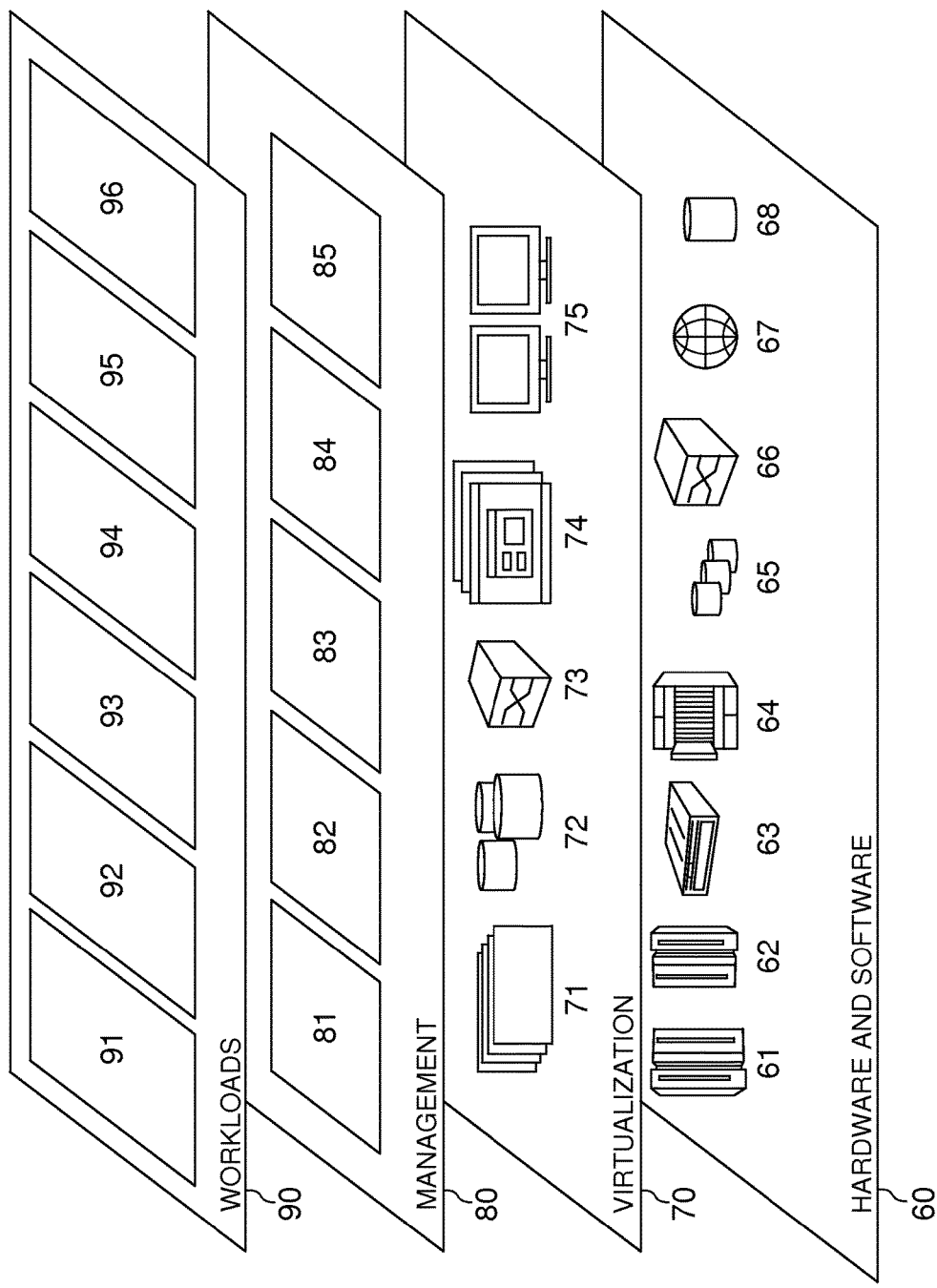
FIG. 6 is a block diagram of functional layers of the illustrative cloud computing environment of FIG. 5, according to an aspect of the invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and game engine workloads 96, such as those described in connection with FIGS. 1-3.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for executing commands in a distributed computing environment, comprising:
   receiving a plurality of distributed commands from one or more devices in the distributed computing environment, wherein each distributed command corresponds to one or more shards hosted by a plurality of servers, and wherein each shard represents an area within a virtual world, and wherein each shard executes, by a hosting server within the plurality of servers, a discrete event simulation, and wherein events comprise player commands and virtual world changes;
   determining a global command execution order for executing the received plurality of distributed commands;
   dispatching the received plurality of distributed commands to a plurality of servers hosting a plurality of corresponding shards in the distributed computing environment, wherein a given distributed command, of the plurality of distributed commands, corresponds to one or more of a given shard, of the plurality of shards, if the given distributed command pertains to a state hosted by the one or more given shard, and wherein dispatching the received plurality of distributed commands comprises:
     receiving confirmation of receipt of the plurality of distributed commands;
     dividing the received plurality of distributed commands into dispatching ticks, wherein a dispatching tick is the same length as a current iteration of a simulation loop but with a different start time and a different end time from the current iteration of a simulation loop; and
     forming a consensus at an end of the dispatching tick before moving to a next dispatching tick; and
   executing, by the one or more given shard, the given distributed command of the plurality of distributed commands, wherein the execution is deterministic, and wherein a result of deterministic execution of the given distributed command is unanimous among the one or more given shard.

2. The method of claim 1, further comprising:
   executing the received plurality of distributed commands on the plurality of servers according to the determined global command execution order.

3. The method of claim 1, further comprising:
   receiving a plurality of local commands from the one or more devices in the distributed computing environment;
   dispatching the received plurality of local commands to a single device within the plurality of servers; and
   executing, by the single device, the received plurality of local commands, wherein the received plurality of local commands belongs to a current iteration of a simulation loop being performed by the single device within the plurality of servers.

4. The method of claim 1, wherein the distributed computing environment simulates a massive multiplayer online game (MMO), and the plurality of distributed commands are MMO commands.

5. The method of claim 1, wherein determining a global command execution order comprises:
   adding timestamps to the plurality of distributed commands; and
   determining the global command execution order based on the timestamps.

6. The method of claim 1, further comprising:
   logging the plurality of distributed commands in storage;
   detecting a failed server in the plurality of servers during execution of the plurality of distributed commands on the failed server;
   recovering, by the failed server, from the failure; and
   executing, by the failed server, the plurality of distributed commands associated with the failed server, according to the determined global command execution order.

7. The method of claim 1, further comprising:
   determining which of the plurality of distributed commands are asymmetric;
   transmitting states between the plurality of servers using a state transmission module; and
   determining the global command execution order, whereby a given distributed command does not delay execution of a local command on the same shard if the given distributed command depends on another distributed command on another shard executing first.

8. A computer system for executing commands in a distributed computing environment, comprising:
   a computer device of a plurality of servers having a processor and a tangible storage device; and
   a program embodied on the tangible storage device for execution by the processor, the program having a plurality of program instructions to:
   receive a plurality of distributed commands from one or more devices in the distributed computing environment, wherein each distributed command corresponds to one or more shards hosted by a plurality of servers, and wherein each shard represents an area within a virtual world, and wherein each shard executes, by a hosting server within the plurality of servers, a discrete event simulation, and wherein events comprise player commands and virtual world changes;
   determine a global command execution order for executing the received plurality of distributed commands;
   dispatch the received plurality of distributed commands to the plurality of servers hosting a plurality of corresponding shards in the distributed computing environment, wherein a given distributed command, of the plurality of distributed commands, corresponds to one or more of a given shard, of the plurality of shards, if the given distributed command pertains to a state hosted by the one or more given shard, and wherein dispatching the received plurality of distributed commands comprises:

receiving confirmation of receipt of the plurality of distributed commands;

dividing the received plurality of distributed commands into dispatching ticks, wherein a dispatching tick is the same length as a current iteration of a simulation loop but with a different start time and a different end time from the current iteration of a simulation loop; and forming a consensus at an end of the dispatching tick before moving to a next dispatching tick; and execute, by the one or more given shard, the given distributed command of the plurality of distributed commands, wherein the execution is deterministic, and wherein a result of deterministic execution of the given distributed command is unanimous among the one or more given shard.

9. The system of claim 8, wherein the program instructions further comprise instructions to:

execute the received plurality of distributed commands on the plurality of servers according to the determined global command execution order.

10. The system of claim 8, wherein the program instructions further comprise instructions to:

receive a plurality of local commands from the one or more devices in the distributed computing environment;

dispatch the received plurality of local commands to a single device within the plurality of servers; and execute the received plurality of local commands, wherein the received plurality of local commands belongs to a current iteration of a simulation loop being performed by the single device within the plurality of servers.

11. The system of claim 8, wherein the distributed computing environment simulates a massive multiplayer online game (MMO), and the plurality of distributed commands are MMO commands.

12. The system of claim 8, wherein program instructions to determine a global command execution order comprise instructions to:

add timestamps to the plurality of distributed commands; and determine the global command execution order based on the timestamps.

13. The system of claim 8, wherein the program instructions further comprise instructions to:

log the plurality of distributed commands in storage;

detect a failed server of the plurality of servers during execution of the plurality of distributed commands on the failed server;

recover, by the failed server, from the failure; and execute, by the failed server, the plurality of distributed commands associated with the failed server, according to the determined global command execution order.

14. A computer program product for executing commands in a distributed computing environment, comprising a tangible storage device having program code embodied therewith, the program code executable by a processor of a computer of a plurality of computers to perform a method, the method comprising:

receiving a plurality of distributed commands, by the processor, from one or more devices in the distributed computing environment, wherein each distributed command corresponds to one or more shards hosted by a plurality of servers, and wherein each shard represents an area within a virtual world, and wherein each shard executes, by a hosting server within the plurality of servers, a discrete event simulation, and wherein events comprise player commands and virtual world changes;

determining a global command execution order, by the processor, for executing the received plurality of distributed commands;

dispatching the received plurality of distributed commands, by the processor, to the plurality of servers hosting a plurality of corresponding shards in the distributed computing environment, wherein a given distributed command, of the plurality of distributed commands, corresponds to one or more of a given shard, of the plurality of shards, if the given distributed command pertains to a state hosted by the one or more given shard, and wherein dispatching the received plurality of distributed commands comprises:

receiving confirmation of receipt of the plurality of distributed commands;

dividing the received plurality of distributed commands into dispatching ticks, wherein a dispatching tick is the same length as a current iteration of a simulation loop but with a different start time and a different end time from the current iteration of a simulation loop; and forming a consensus at an end of the dispatching tick before moving to a next dispatching tick; and executing, by the one or more given shard, the given distributed command of the plurality of distributed commands, wherein the execution is deterministic, and wherein a result of deterministic execution of the given distributed command is unanimous among the one or more given shard.

15. The computer program product of claim 14, wherein the method further comprises:

receiving a plurality of local commands, by the processor, from the one or more devices in the distributed computing environment;

dispatching the received plurality of local commands, by the processor, to a single device within the plurality of servers; and executing the received plurality of local commands, wherein the received plurality of local commands belongs to a current iteration of a simulation loop being performed by the single device within the plurality of servers.

16. The computer program product of claim 14, wherein the distributed computing environment simulates a massive multiplayer online game (MMO), and the plurality of distributed commands are MMO commands.

17. The computer program product of claim 14, wherein the method further comprises:

logging the plurality of distributed commands in storage, by the processor;

detecting, by the processor, a failed server of the plurality of servers during execution of the plurality of distributed commands on the failed server;

recovering, by the failed server, from the failure; and executing, by the failed server, the plurality of distributed commands associated with the failed server, according to the determined global command execution order.

18. The computer program product of claim 14, wherein the method further comprises:

determining, by the processor, which of the plurality of distributed commands are asymmetric;

transmitting states, by the processor, between the plurality of servers using a state transmission module; and determining the global command execution order, by the processor, whereby a given distributed command does not delay execution of a local command on the same shard if the given distributed command depends on another distributed command on another shard executing first.

* * * * *